(12) United States Patent
Contractor et al.

(10) Patent No.: US 10,672,155 B2
(45) Date of Patent: Jun. 2, 2020

(54) NON-LINEAR, MULTI-RESOLUTION VISUALIZATION OF A GRAPH

(71) Applicant: International Business Machines Corporation, Armonk, NY (US)

(72) Inventors: Danish Contractor, Bangalore (IN); Varun Parashar, New Delhi (IN); Nitendra Rajput, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 15/238,814

(22) Filed: Aug. 17, 2016

(65) Prior Publication Data
US 2018/0053327 A1    Feb. 22, 2018

(51) Int. Cl.
| G06T 11/20 | (2006.01) |
| G06T 3/40 | (2006.01) |
| G06K 9/62 | (2006.01) |
| G06F 16/35 | (2019.01) |
| G06F 16/901 | (2019.01) |

(52) U.S. Cl.
CPC ............ *G06T 11/206* (2013.01); *G06F 16/35* (2019.01); *G06F 16/9024* (2019.01); *G06K 9/6219* (2013.01); *G06T 3/4076* (2013.01)

(58) Field of Classification Search
None
See application file for complete search history.

(56) References Cited

U.S. PATENT DOCUMENTS

| 6,016,152 A | 1/2000 | Dickie |
| 6,424,933 B1 | 7/2002 | Agrawala et al. |
| 8,086,073 B2 | 12/2011 | Jeffrey |
| 8,671,353 B1 * | 3/2014 | Varadarajan ....... G06Q 30/0201 715/763 |
| 2006/0222243 A1 * | 10/2006 | Newell ............. G06K 9/00295 382/173 |
| 2008/0118237 A1 * | 5/2008 | Wegenkittl ........... G06F 3/0481 396/76 |

(Continued)

OTHER PUBLICATIONS

Rodrigues et al., GMine: A System for Scalable, Interactive Graph Visualization and Mining. VLDB 2006.

(Continued)

*Primary Examiner* — Ke Xiao
*Assistant Examiner* — Jed-Justin Imperial
(74) *Attorney, Agent, or Firm* — Ryan, Mason & Lewis, LLP

(57) ABSTRACT

Methods, systems, and computer program products for non-linear, multi-resolution visualization of a graph are provided herein. A computer-implemented method includes generating multiple sub-graphs derived from an input knowledge graph, wherein the input knowledge graph comprises multiple nodes and multiple edges, and wherein each of the generated sub-graphs comprises a distinct level of resolution; processing an input comprising at least one area of user interest on the input knowledge graph; generating a multi-resolution version of the input knowledge graph by combining two or more of the generated sub-graphs, wherein the two or more sub-graphs are selected based on the at least one area of user interest; and outputting the multi-resolution version of the input knowledge graph to the user via an interactive mechanism.

19 Claims, 6 Drawing Sheets

(56) References Cited

U.S. PATENT DOCUMENTS

| | | | | |
|---|---|---|---|---|
| 2008/0307303 | A1* | 12/2008 | Louch | G06F 3/0481 715/273 |
| 2014/0214936 | A1* | 7/2014 | Abraham | H04W 4/206 709/204 |
| 2014/0223575 | A1* | 8/2014 | Nandi | G06Q 30/0282 726/27 |
| 2014/0365647 | A1 | 12/2014 | Haraszti | |
| 2015/0089422 | A1* | 3/2015 | Spaulding | G06F 3/04842 715/771 |
| 2015/0138203 | A1 | 5/2015 | Nachmason et al. | |
| 2015/0172550 | A1* | 6/2015 | Bretscher | H04N 5/23293 348/140 |
| 2016/0042514 | A1* | 2/2016 | Amat Roldan | G06T 7/0016 382/131 |
| 2016/0099860 | A1* | 4/2016 | Huang | H04L 45/70 370/389 |
| 2016/0133162 | A1 | 5/2016 | Contractor et al. | |
| 2016/0247088 | A1* | 8/2016 | Nassar | G06N 99/005 |
| 2017/0090890 | A1* | 3/2017 | Hale | G06F 16/2237 |

OTHER PUBLICATIONS

Asghar et al., Nonlinear Multiresolution Techniques with Applications to Scientific Visualization in a Haptic Environment. IEEE Transactions on Visualization and Computer Graphics, vol. 7, No. 1, 2001.

Henry et al., NodeTrix: a Hybrid Visualization of Social Networks. IEEE Transactions on Visualization and Computer Graphics, vol. 13, No. 6, 2007.

Zhao et al., Elastic hierarchies: combining treemaps and node-link diagrams, INFOVIS 2005.

\* cited by examiner

NON-LINEAR, MULTI-RESOLUTION VISUALIZATION OF A GRAPH

FIELD

The present application generally relates to information technology, and, more particularly, to graph-related analyses and visualization.

BACKGROUND

Knowledge graphs and geographical maps commonly contain many nodes and edges. Navigating such graphs/maps to determine a path (learning or directional, for instance), as well as subsequently navigating the path to determine a user's progress can therefore be complicated. For example, carrying out the visual navigation of such graphs/maps via tablets and/or mobile devices can be challenging due to the small screen sizes of such devices. For instance, a zoom-out function can potentially display an entire graph/map, but cannot present information of each individual node; while a zoom-in function can enable the presentation of information on the nodes, but cannot display the entire graph/map. Moreover, with more learning and map-related activities being carried out on mobile devices and tablets, such visualization challenges are more prevalent.

SUMMARY

In one embodiment of the present invention, techniques for non-linear, multi-resolution visualization of a graph are provided. An exemplary computer-implemented method can include steps of generating multiple sub-graphs derived from an input knowledge graph, wherein the input knowledge graph comprises multiple nodes and multiple edges, and wherein each of the generated sub-graphs comprises a distinct level of resolution, and processing an input comprising at least one area of user interest on the input knowledge graph. Such a method can also include generating a multi-resolution version of the input knowledge graph by combining two or more of the generated sub-graphs, wherein the two or more sub-graphs are selected based on the at least one area of user interest, and outputting the multi-resolution version of the input knowledge graph to the user via an interactive mechanism.

In another embodiment of the invention, an exemplary computer-implemented method can include steps of generating multiple sub-maps derived from an input map, wherein the input map comprises multiple nodes and multiple edges, and wherein each of the generated sub-maps comprises a distinct level of resolution, and processing an input comprising at least one area of user interest on the input map. Such a method can also include generating a multi-resolution version of the input map by combining two or more of the generated sub-maps, wherein the two or more sub-maps are selected based on the at least one area of user interest, and outputting the multi-resolution version of the input map to the user via an interactive mechanism.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
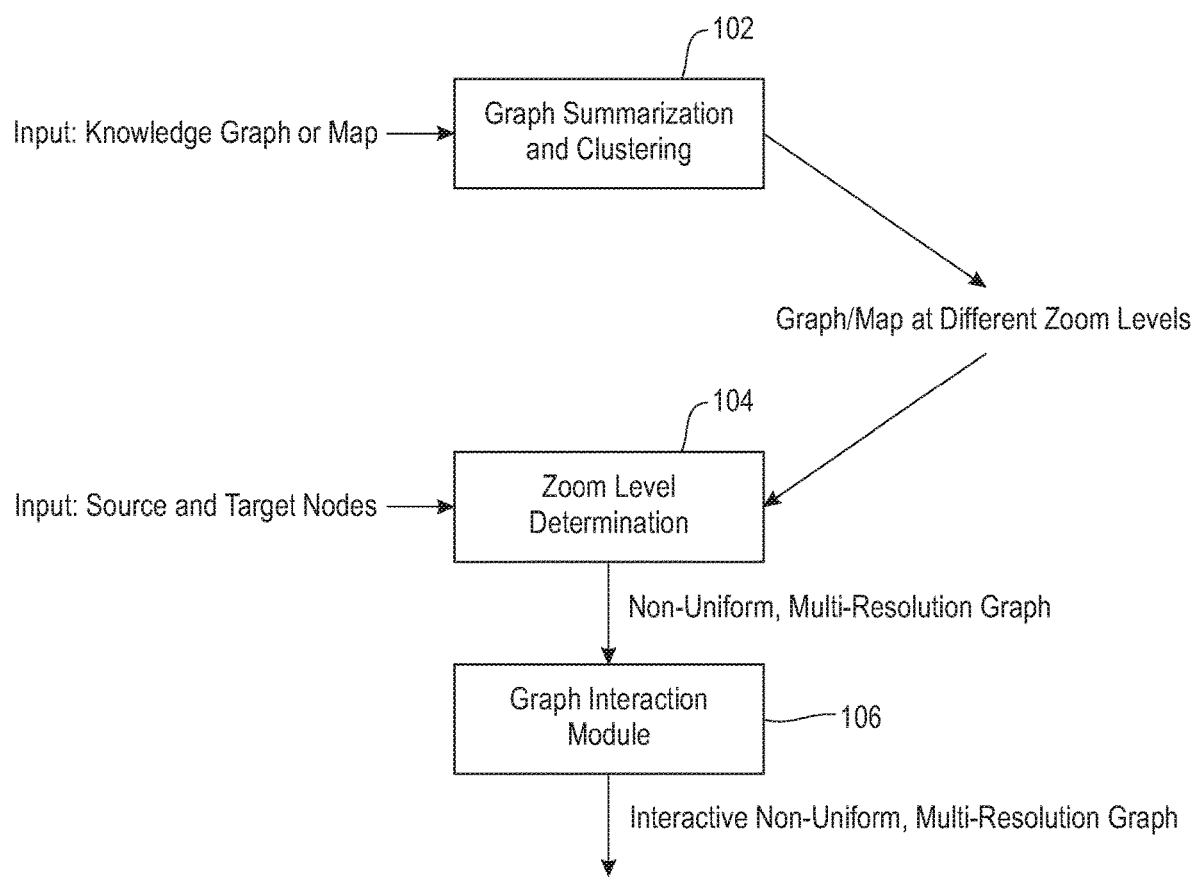
FIG. 1 is a diagram illustrating system architecture, according to an exemplary embodiment of the invention.

As described herein, an embodiment of the present invention includes non-linear, multi-resolution visualization of a graph. As used herein, a non-linear visualization refers to a graph visualization such that the zoom at different points in the graph is different and does not vary linearly across the graph. As an example, in a non-linear visualization, the zoom-out from a point of interest can be in proportion to the square of the distance. Additionally, the following equation includes an example zoom level from the source in a non-linear graph: zoom (at distance d from point of interest) $=K/d^2$, wherein K is a constant.

At least one embodiment of the invention includes generating a knowledge graph or map that can provide information at different levels while preserving the global structure of the graph or map. Such an embodiment can include taking a knowledge graph (or map) as input, and generating multiple knowledge graphs (or maps) that represent the same content but at different levels of granularity. By way of example, the multiple generated knowledge graphs (or maps) can include a knowledge graph (or map) generated for each node of the original knowledge graph (or map).

Further, such an embodiment can include visualizing and displaying a non-linear granularity graph/map based on a query and/or stated interest of a user. In such an embodiment, the non-linear granularity map is not one of the multiple knowledge graphs generated as described in the previous paragraph, but, rather, the non-linear granularity map is formed through a combination of multiple knowledge graphs that are generated as described in the previous paragraph.

The non-linear visualization can be performed, for example, such that the locally relevant nodes (of the graph or map), per the user query and/or interest, receive greater priority (than the non-locally relevant nodes) and hence greater resolution. The level of resolution of the graph or map can be determined through one or more hierarchical methods and/or one or more semantic methods. As used herein, hierarchical methods include clustering algorithms in which a hierarchy of nodes is created in a tree-like structure referred to as a dendrogram. The root of the tree represents one node which contains all of the data points (documents). The number of the leaves of the tree is equal to the total number of data points (documents), and each leaf represents a node which corresponds to a single data point (document). Semantic methods use lexical and semantic information such as, for example, part of speech, word sense, gloss, etymology, pronunciation, declension and translations from the text data. Lexically or semantically related terms of several types, such as synonyms, antonyms, hypernyms and/or hyponyms, can be included as well to generate a semantic similarity that can be used to create multi-resolution graphs.

In the case of graphs with textual nodes, for example, the zoom levels can also be determined based on a notion of "similarity" between nodes. Consider a learning knowledge graph and assume that a user wishes to render a learning path way on a device screen. Different zoom levels will cause nodes along the path way to appear smaller (or collapsed) while the end notes will appear larger. Semantic methods can be used to infer groups of similar nodes among the zoomed-out nodes, and to render such grouped nodes as one node (or fewer nodes) and optionally label them using an automated method. Such an automated method can depend on the task in question; in the case of concepts, the automated method can include the identification of a broader topic covering those concepts (for example, by looking-up an external concept taxonomy).

The non-linearity in the level of resolution of the graph or map at different locations can be determined, for example, by an interactive mechanism of zoom and pan gestures. The interactive zoom/pan mechanism can be incorporated into a user interface (UI) for user interaction. However, the server side can be used to generate the non-linear, multi-resolution graph that the user expresses interest in through the zoom/pan interaction. Alternatively, such generation can also be performed on the client side.

Accordingly, one or more embodiments of the invention include enabling non-linear zooming such that the global structure of a graph or map remains available while providing local information within a targeted portion of one or more nodes. As also detailed herein, such an embodiment can include performing non-linear scaling of a graph or map, creating semantic nodes at different levels of granularity to support multi-resolution, carrying out elastic visualization for maps and graphs, and providing an interaction mechanism for such non-linear multi-resolution zooming and navigation.

FIG. 1 is a diagram illustrating system architecture, according to an embodiment of the invention. By way of illustration, FIG. 1 depicts a graph summarization and clustering component 102, a zoom level determination component 104, and a graph interaction module 106. Specifically, and as depicted in FIG. 1, based on an input knowledge graph or map, the graph summarization and clustering component 102 generates multiple graphs/maps that are at different levels of granularity/resolution. The graph summarization and clustering component 102 can identify node clusters using one or more lexical semantics-based clustering techniques such as, for example, name tagging with word clusters. In one or more embodiments of the invention, word clusters can be induced from a corpus of data. Additionally, the graph summarization and clustering component 102 can also carry out one or more graph summarization techniques such as, for example, degree distributions, hopplots and clustering coefficients, to generate the graphs/maps at different resolutions.

By way of example, consider a large map of the USA which includes all U.S. cities and towns therein. At least one embodiment of the invention can include clustering all of the cities and towns within a state into one node and subsequently display a map at the level of states. Accordingly, this one resolution of the graph only shows states in the USA. A next level of resolution of the graph can be similarly made to display states and the capital cities thereof. A third level of the resolution of the graph can be made to display states, capital cities thereof, and all cities thereof.

Further, given additional input of an area of interest (which can include source and target nodes), the zoom level determination component 104 determines the appropriate zoom level(s) at different points in one or more of the generated graphs/maps. Further, based on determined zoom level(s), the zoom level determination component 104 generates a non-uniform multi-resolution graph. After having identified the source and target areas of interest, the zoom level determination component 104 can implement one or more isoelastic functions to determine the appropriate zoom level at each location via, for example: zoom_f(d)=kd$^r$, wherein zoom_f is the zoom function, d is the distance of the area for which the zoom is being calculated from the source/target node (whichever is smaller), k is a constant and r is the elasticity function. In this manner, the zoom level at different parts of the entire graph is determined. Once the zoom level for each part of the graph is determined, the entire graph is created by stitching together the different zoom levels from different areas into a single graph. This resulting graph, having different zoom levels at different places, then forms the non-linear, multi-resolution graph which is passed to the graph interaction module 106, and which can then be used by a user. The user can subsequently interact with the graph via module 106, generate other areas of interest and continuously recreate a new graph based on the user's interest. Such an embodiment of the invention provides the appropriate sub-graph to insert at each position in the view/zoom level.

At least one embodiment of the invention additionally includes determining node size for one or more visualizations. The size of the nodes can be adjusted based, for example, on a function of one or more of the following: screen resolution(s), canvas size, screen size, number of nodes along a given path, as well as the maximum and minimum size of any node. An example function for determining node size can include, for instance:

$$K + se^{-\frac{ls}{x^2}},$$

wherein s=canvas size/resolution, l=the number of nodes in the given path, k=a constant (such as the minimum size of nodes), and x=the distance from the center of the given path (and "e" is the base of the natural logarithm).

Additionally, given the zoom level(s) present in the non-uniform multi-resolution graph, the graph interaction module 106 can determine an interaction pattern (such as elastic zoom) that is to be used to interact with the non-uniform multi-resolution graph. As used herein, elastic zoom refers to a zoom pattern that can be visualized, for instance, when a map is printed on an elastic surface and the point of interest is stretched. The effect that occurs on such an elastic surface is that the point that is stretched gets a higher zoom while the other points adjust their respective zooms to reduce their zoom (analogous to how an elastic surface behaves).

Given a non-uniform graph/map (as created by the zoom level determination component 104), as soon as the user touches on a part of the graph/map to indicate the user "interest area," at least one embodiment of the invention can include re-calculating the zoom level at all parts in the map using a ripple function such as the following: $z=P*(\cos 0.5 \sqrt{(x^2+y^2)}-6n) \div (0.5(x^2+y^2)+1+2n)$, wherein $n=\{0 \ldots 10\}$, wherein P is the pressure applied by the user. Such a ripple function automatically reduces the zoom level as the distance from the "interest-area" increases. The ripple function also generates new zoom level determinations for the entire graph/map.

Figure 2A:
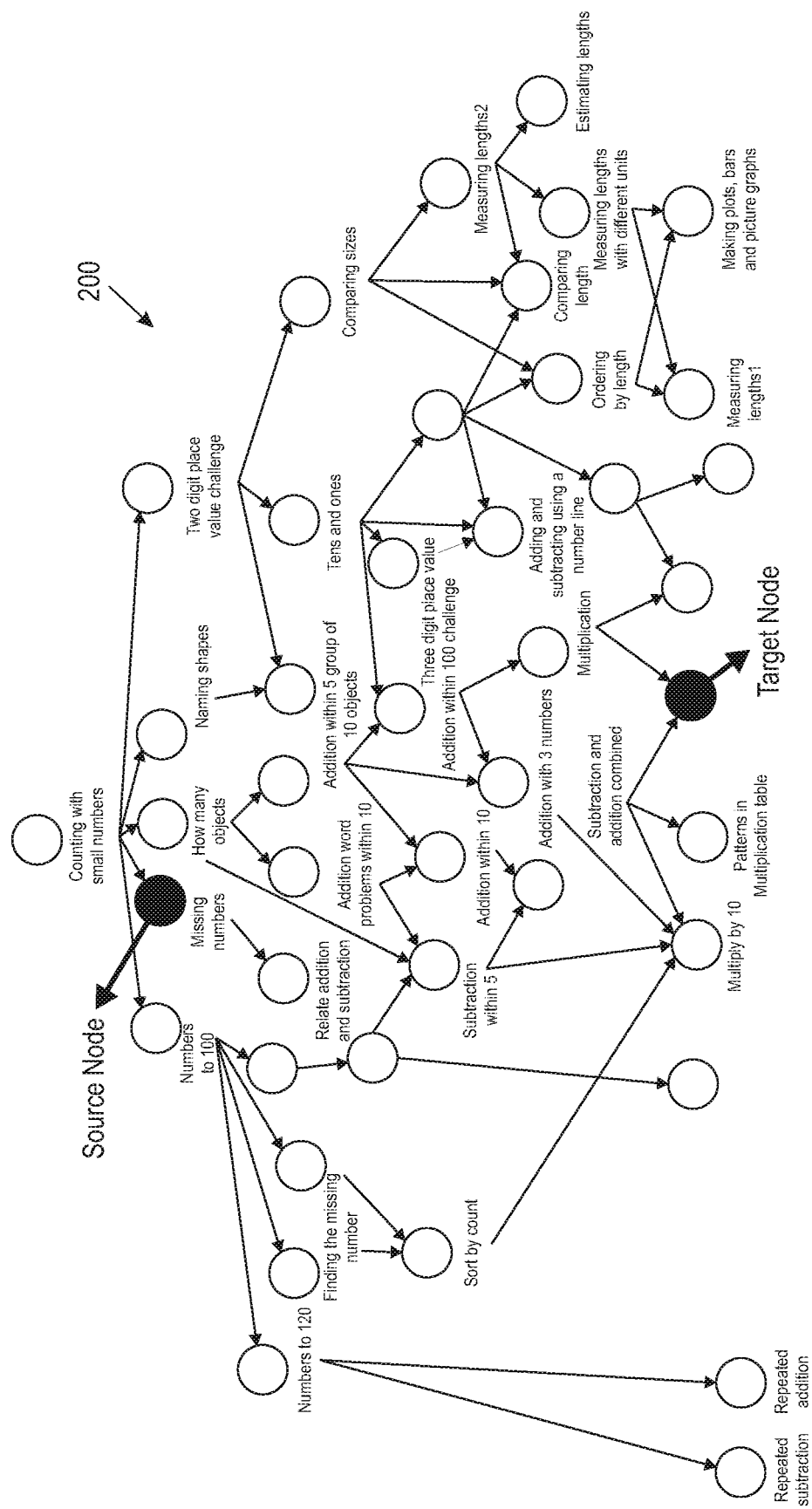
FIG. 2A is a diagram illustrating an example knowledge graph, according to an exemplary embodiment of the invention.
Figure 2B:
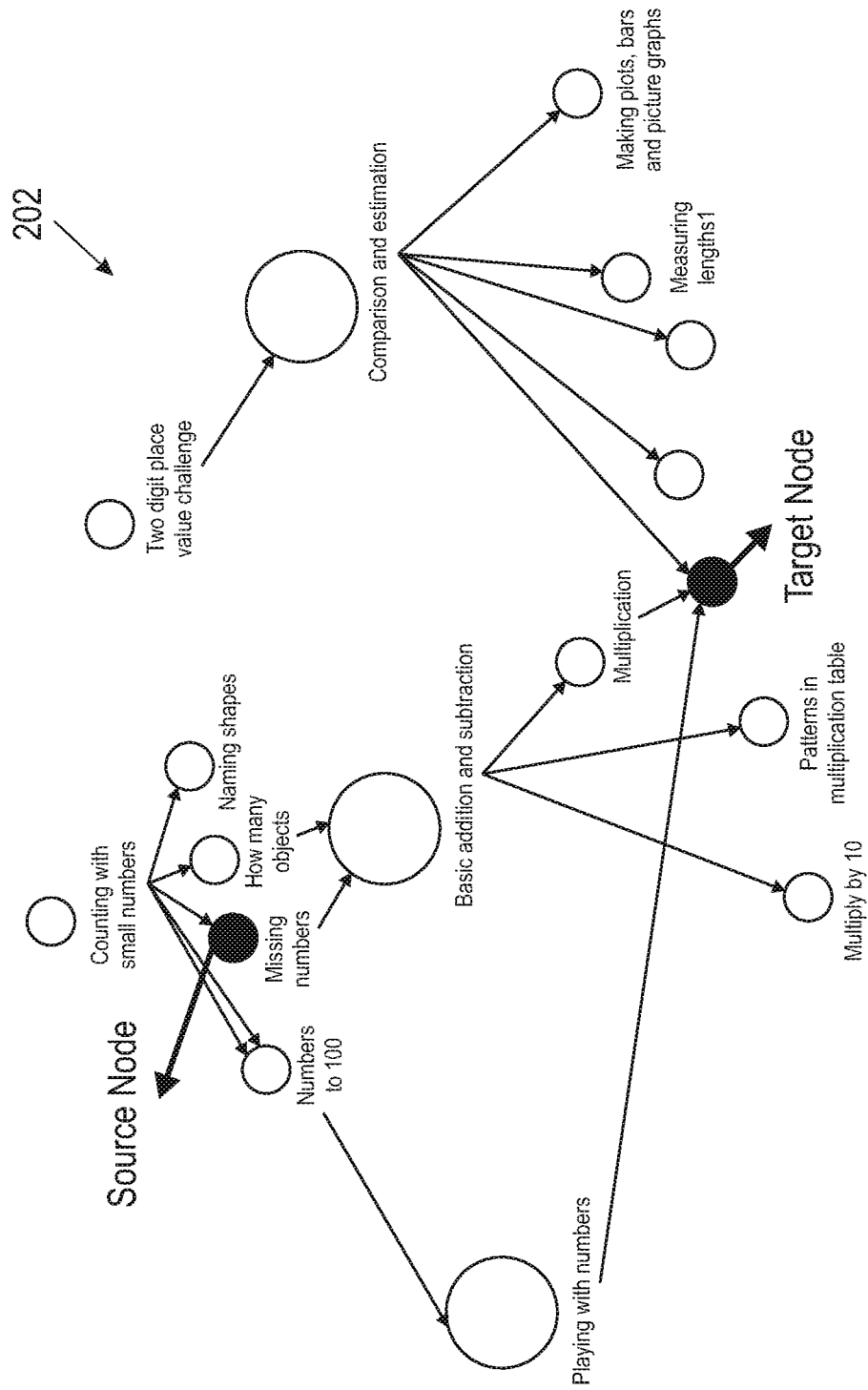
FIG. 2B is a diagram illustrating a first example view of the knowledge graph with non-linear multi-resolution zooming, according to an exemplary embodiment of the invention.
Figure 2C:
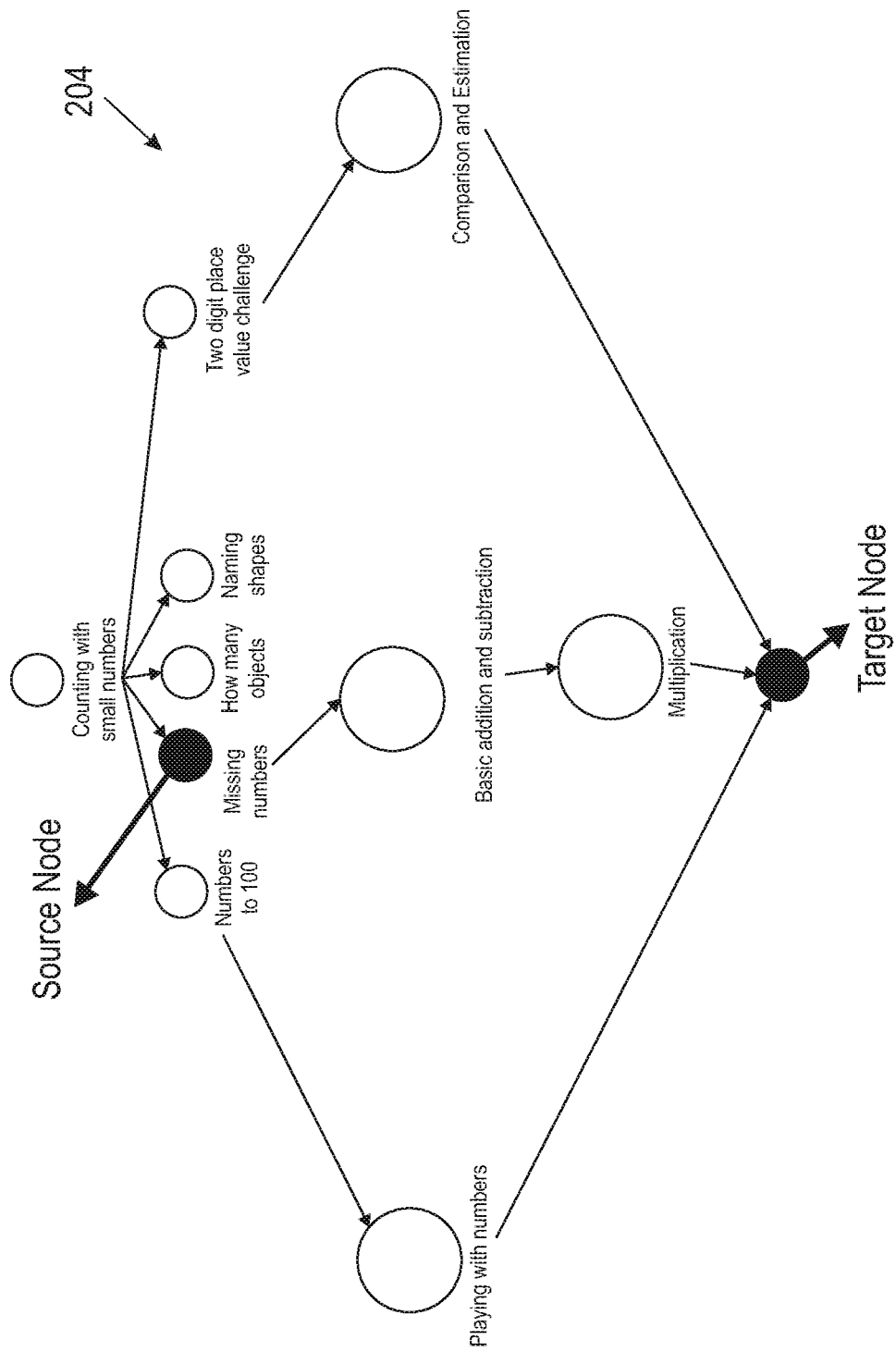
FIG. 2C is a diagram illustrating a second example view of the knowledge graph with non-linear multi-resolution zooming, according to an exemplary embodiment of the invention.

FIG. 2A is a diagram illustrating an example knowledge graph 200, according to an exemplary embodiment of the invention. FIG. 2B is a diagram illustrating a first example view 202 of the knowledge graph 200 with non-linear multi-resolution zooming, according to an exemplary embodiment of the invention. FIG. 2C is a diagram illustrating a second example view 204 of the knowledge graph 200 with non-linear multi-resolution zooming, according to an exemplary embodiment of the invention.

Specifically, FIG. 2A shows the original graph wherein a learning pathway between the source node and target node is identified. FIG. 2B collapses the intermediate nodes on the path and creates one group. FIG. 2C shows the same view (and FIG. 2B) but removes additional edges not part of the path. As seen in graph 200, the entire knowledge graph is too large and perhaps too big to fit on a small mobile screen. Knowing that the user is interested only in the source and the target node, a new knowledge graph is created as shown in 202. This knowledge graph has multi-resolution. As seen in the nodes near the source and target nodes, such nodes appear in the same resolution as the nodes in graph 200. However, the nodes that are between the source and target nodes now appear (in graph 202) in a lower-resolution (larger-sized nodes named "Playing with numbers," "Basic addition and subtraction," and "Comparison and Estimation"). Thus, only the nodes that are near the source and target nodes maintain the higher resolution, while the other nodes have a lower resolution. This forms the multi-resolution graph that can, for example, fit on a mobile device screen. Further graph 204 shows yet another multi-resolution representation wherein the nodes other than the source and target nodes have been merged to create an even smaller graph. However, even here, the resolution around the source and the target nodes remains as high/large as in graph 200.

Figure 3:
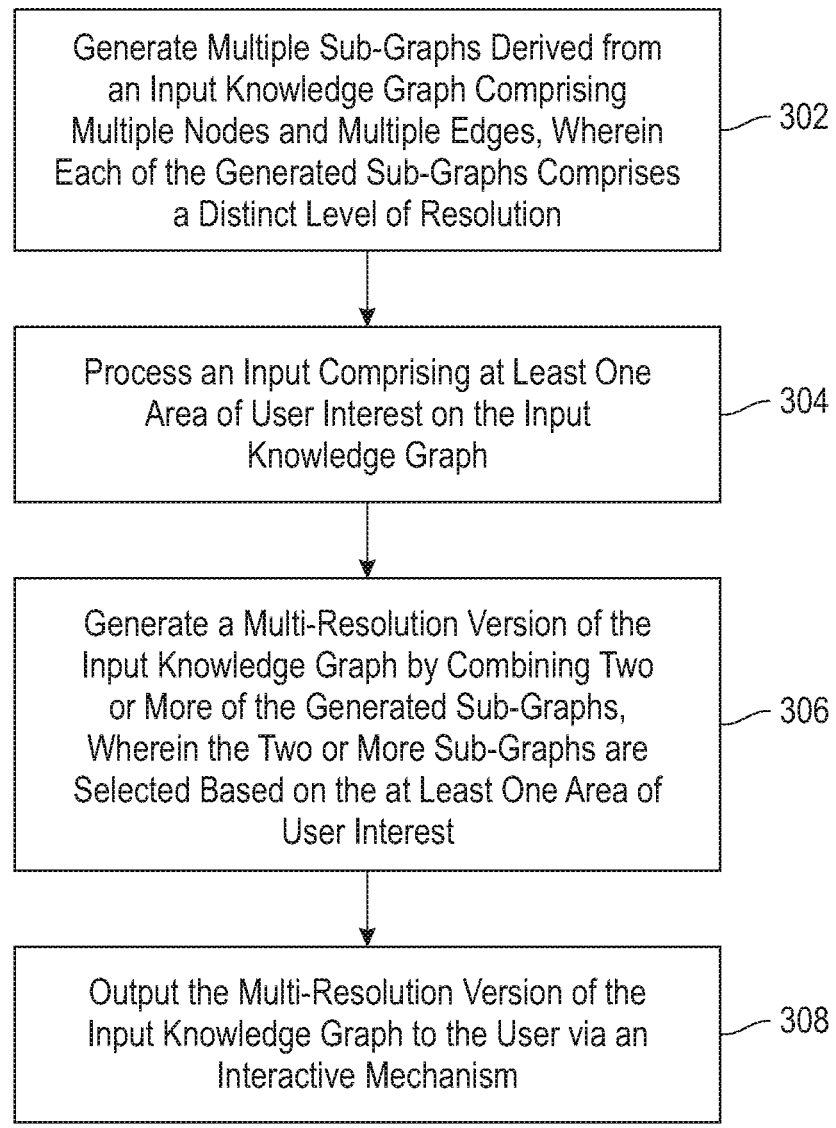
FIG. 3 is a flow diagram illustrating techniques according to an embodiment of the invention.

FIG. 3 is a flow diagram illustrating techniques according to an embodiment of the present invention. Step 302 includes generating multiple sub-graphs derived from an input knowledge graph, wherein the input knowledge graph comprises multiple nodes and multiple edges, and wherein each of the generated sub-graphs comprises a distinct level of resolution. Generating multiple sub-graphs can include identifying multiple clusters of two or more of the multiple nodes of the input knowledge graph, wherein identifying multiple clusters can include implementing one or more semantics-based clustering techniques. Additionally, generating multiple sub-graphs can include summarizing the input knowledge graph via one or more degree distributions and/or one or more clustering coefficients.

Step 304 includes processing an input comprising at least one area of user interest on the input knowledge graph. The at least one area of user interest can include (i) a source node and (ii) a target node. Step 306 includes generating a multi-resolution version of the input knowledge graph by combining two or more of the generated sub-graphs, wherein the two or more sub-graphs are selected based on the at least one area of user interest. Combining two or more of the generated sub-graphs can include inserting the selected two or more sub-graphs at corresponding positions of the input knowledge graph, and removing one or more remaining positions of the input knowledge graph.

Step 308 includes outputting the multi-resolution version of the input knowledge graph to the user via an interactive mechanism. At least one embodiment of the invention can also include adjusting the size of the one or more nodes of the two or more selected sub-graphs. Such adjusting can be based, for example, on screen resolution of a device from which the at least one area of user interest input is provided, screen size of a device from which the at least one area of user interest input is provided, the number of nodes present in a path captured in the two or more selected sub-graphs, a predetermined maximum node size, and/or a predetermined minimum node size.

The techniques depicted in FIG. 3 can also include calculating a level of resolution for all portions of the multi-resolution version of the input knowledge graph in response to an input comprising an updated area of user interest.

Also, an additional embodiment of the invention includes generating multiple sub-maps derived from an input map, wherein the input map comprises multiple nodes and multiple edges, and wherein each of the generated sub-maps comprises a distinct level of resolution, and processing an input comprising at least one area of user interest on the input map (such as, for example, a source node and a target node). Such an embodiment can also include generating a multi-resolution version of the input map by combining two or more of the generated sub-maps, wherein the two or more sub-maps are selected based on the at least one area of user interest, and outputting the multi-resolution version of the input map to the user via an interactive mechanism. In such an embodiment, generating multiple sub-maps can include identifying multiple clusters of two or more of the multiple nodes of the input map. Further, such an embodiment can additionally include calculating a level of resolution for all portions of the multi-resolution version of the input map in response to an input comprising an updated area of user interest.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives graph/map area of interest input (such as source and target nodes) information sent from a data source to the transmission server. The server can process the information, for example, based upon user-provided user preference information that is stored in memory on the server. Subsequently, an alert is generated containing an interactive non-uniform, multi-resolution graph/map. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer usable program code that is stored in a computer readable storage medium in a data processing system, and wherein the computer usable program code was downloaded over a network from a remote data processing system. Also, in an embodiment of the invention, the computer program product can include computer usable program code that is stored in a computer readable storage medium in a server data processing system, and wherein the computer usable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
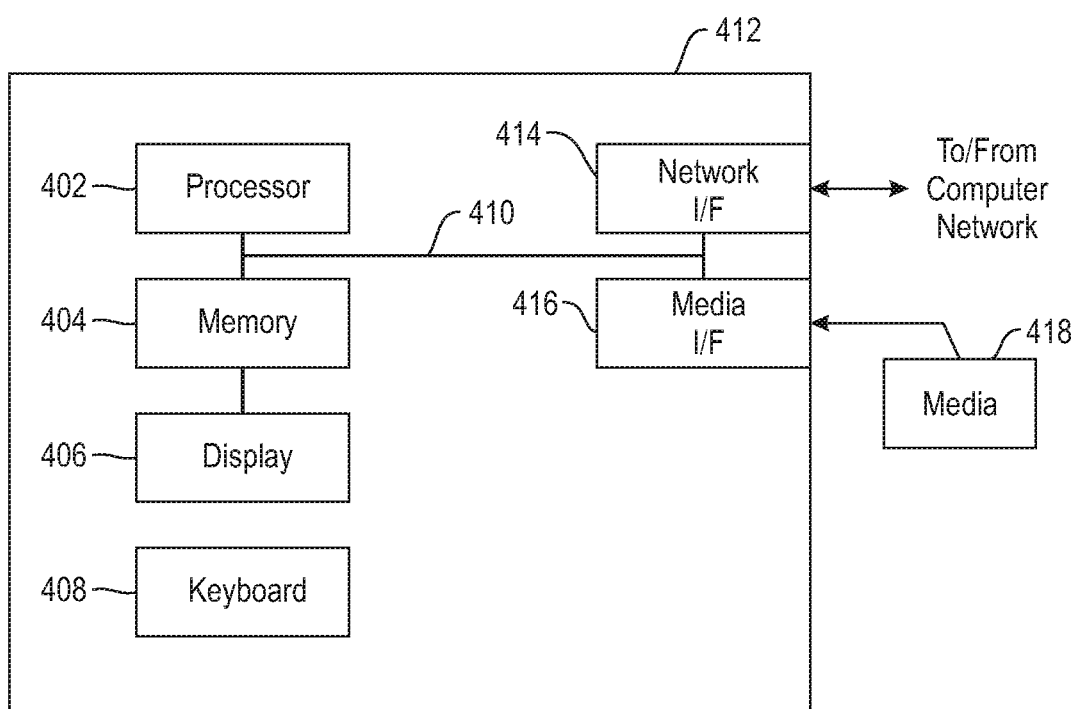
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating semantic nodes at different levels of granularity to support multi-resolution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating multiple sub-graphs derived from an input knowledge graph, wherein the input knowledge graph comprises multiple nodes and multiple edges, and wherein each of the generated sub-graphs comprises a distinct level of resolution, wherein each distinct level of resolution comprises a distinct granularity of at least a portion of the input knowledge graph that prioritizes one or more of the multiple nodes of the input knowledge graph relative to the other nodes of the input knowledge graph;
processing an input corresponding to at least one area of user interest on the input knowledge graph;
generating a multi-resolution version of the input knowledge graph that non-linearly varies a zoom level at different points of the multi-resolution version by (i) combining two or more of the generated sub-graphs and (ii) displaying the combined sub-graphs within at least a portion of the input knowledge graph, wherein the two or more sub-graphs are selected based on the at least one area of user interest, wherein said zoom level varies non-linearly at the different points of the multi-resolution version based on the following equation: $K/d^2$, wherein d is the distance from the at least one area of user interest, and wherein K is a constant; and
outputting the multi-resolution version of the input knowledge graph to the user via an interactive mechanism;
wherein the steps are carried out by at least one computing device.

2. The computer-implemented method of claim 1, comprising:
calculating a level of resolution for all portions of the multi-resolution version of the input knowledge graph in response to an input comprising an updated area of user interest.

3. The computer-implemented method of claim 1, wherein said generating multiple sub-graphs comprises identifying multiple clusters of two or more of the multiple nodes of the input knowledge graph.

4. The computer-implemented method of claim 3, wherein said identifying multiple clusters comprises implementing one or more semantics-based clustering techniques.

5. The computer-implemented method of claim 1, wherein said generating multiple sub-graphs comprises summarizing the input knowledge graph via one or more degree distributions.

6. The computer-implemented method of claim 1, wherein said generating multiple sub-graphs comprises summarizing the input knowledge graph via one or more clustering coefficients.

7. The computer-implemented method of claim 1, wherein the at least one area of user interest comprise (i) a source node and (ii) a target node.

8. The computer-implemented method of claim 1, wherein said combining two or more of the generated sub-graphs comprises:
inserting the selected two or more sub-graphs at corresponding positions of the input knowledge graph; and
removing one or more remaining positions of the input knowledge graph.

9. The computer-implemented method of claim 1, comprising:
adjusting the size of the one or more nodes of the two or more selected sub-graphs.

10. The computer-implemented method of claim 9, wherein said adjusting is based on screen resolution of a device from which the at least one area of user interest input is provided.

11. The computer-implemented method of claim 9, wherein said adjusting is based on screen size of a device from which the at least one area of user interest input is provided.

12. The computer-implemented method of claim 9, wherein said adjusting is based on the number of nodes present in a path captured in the two or more selected sub-graphs.

13. The computer-implemented method of claim 9, wherein said adjusting is based on at least one of: (i) a predetermined maximum node size, and (ii) a predetermined minimum node size.

14. A computer program product comprising a non-transitory computer readable storage medium having program instructions embodied therewith, the program instructions executable by a device to cause the device to:
generate multiple sub-graphs derived from an input knowledge graph, wherein the input knowledge graph comprises multiple nodes and multiple edges, and wherein each of the generated sub-graphs comprises a distinct level of resolution, wherein each distinct level of resolution comprises a distinct granularity of at least a portion of the input knowledge graph that prioritizes one or more of the multiple nodes of the input knowledge graph relative to the other nodes of the input knowledge graph;
process an input corresponding to at least one area of user interest on the input knowledge graph;
generate a multi-resolution version of the input knowledge graph that non-linearly varies a zoom level at different points of the multi-resolution version by (i) combining two or more of the generated sub-graphs and (ii) displaying the combined sub-graphs within at least a portion of the input knowledge graph, wherein the two or more sub-graphs are selected based on the at least one area of user interest, wherein said zoom level varies non-linearly at the different points of the multi-resolution version based on the following equation: $K/d^2$, wherein d is the distance from the at least one area of user interest, and wherein K is a constant; and
output the multi-resolution version of the input knowledge graph to the user via an interactive mechanism.

15. A system comprising:
a memory; and
at least one processor coupled to the memory and configured for:
generating multiple sub-graphs derived from an input knowledge graph, wherein the input knowledge graph comprises multiple nodes and multiple edges, and wherein each of the generated sub-graphs comprises a distinct level of resolution, wherein each distinct level of resolution comprises a distinct granularity of at least a portion of the input knowledge graph that prioritizes one or more of the multiple nodes of the input knowledge graph relative to the other nodes of the input knowledge graph;
processing an input corresponding to at least one area of user interest on the input knowledge graph;
generating a multi-resolution version of the input knowledge graph that non-linearly varies a zoom level at different points of the multi-resolution version by (i) combining two or more of the generated sub-graphs and (ii) displaying the combined sub-graphs within at least a portion of the input knowledge graph, wherein the two or more sub-graphs are selected based on the at least one area of user interest, wherein said zoom level varies non-linearly at the different points of the multi-resolution version based on the following equation: $K/d^2$, wherein d is the distance from the at least one area of user interest, and wherein K is a constant; and outputting the multi-resolution version of the input knowledge graph to the user via an interactive mechanism.

16. A computer-implemented method, comprising:

generating multiple sub-maps derived from an input map, wherein the input map comprises multiple nodes and multiple edges, and wherein each of the generated sub-maps comprises a distinct level of resolution, wherein each distinct level of resolution comprises a distinct granularity of at least a portion of the input map that prioritizes one or more of the multiple nodes of the input map relative to the other nodes of the input map;

processing an input corresponding to at least one area of user interest on the input map;

generating multi-resolution version of the input map that non-linearly varies a zoom level at different points of the multi-resolution version by (i) combining two or more of the generated sub-maps and (ii) displaying the combined sub-maps within at least a portion of the input map, wherein said zoom level varies non-linearly at the different points of the multi-resolution version based on the following equation: $K/d^2$, wherein d is the distance from the at least one area of user interest, and wherein K is a constant; and outputting the multi-resolution version of the input map to the user via an interactive mechanism;

wherein the steps are carried out by at least one computing device.

17. The computer-implemented method of claim 16, comprising:

calculating a level of resolution for all portions of the multi-resolution version of the input map in response to an input comprising an updated area of user interest.

18. The computer-implemented method of claim 16, wherein said generating multiple sub-maps comprises identifying multiple clusters of two or more of the multiple nodes of the input map.

19. The computer-implemented method of claim 16, wherein the at least one area of user interest comprise (i) a source node and (ii) a target node.

* * * * *